US011248948B2

(12) United States Patent
Kawanishi

(10) Patent No.: US 11,248,948 B2
(45) Date of Patent: Feb. 15, 2022

(54) COMBINATION WEIGHER HAVING CONTROLLED DISTRIBUTION BY BIDIRECTIONAL FEEDING HOPPERS

(71) Applicant: Shozo Kawanishi, Nishinomiya (JP)

(72) Inventor: Shozo Kawanishi, Nishinomiya (JP)

( * ) Notice: Subject to any disclaimer, the term of this patent is extended or adjusted under 35 U.S.C. 154(b) by 108 days.

(21) Appl. No.: 16/608,687

(22) PCT Filed: Apr. 27, 2018

(86) PCT No.: PCT/JP2018/017292
§ 371 (c)(1),
(2) Date: Oct. 25, 2019

(87) PCT Pub. No.: WO2018/199319
PCT Pub. Date: Nov. 1, 2018

(65) Prior Publication Data
US 2021/0063232 A1    Mar. 4, 2021

(30) Foreign Application Priority Data
Apr. 28, 2017 (JP) .............................. JP2017-089864

(51) Int. Cl.
*G01G 19/393* (2006.01)
(52) U.S. Cl.
CPC ................... *G01G 19/393* (2013.01)

(58) Field of Classification Search
CPC ........................... G01G 19/387; G01G 19/393
See application file for complete search history.

(56) References Cited

U.S. PATENT DOCUMENTS

| 4,397,364 | A | * | 8/1983 | Hirano | G01G 13/28 |
| | | | | | 177/25.18 |
| 4,534,428 | A | * | 8/1985 | Mosher | G01G 19/393 |
| | | | | | 177/1 |
| 4,793,420 | A | * | 12/1988 | Hirano | G01G 13/248 |
| | | | | | 177/50 |
| 9,194,735 | B2 | * | 11/2015 | Tamai | G01G 19/393 |
| 2019/0137323 | A1 | * | 5/2019 | Kawanishi | G01G 13/242 |

FOREIGN PATENT DOCUMENTS

| JP | H0545889 B2 | 7/1993 |
| JP | H0625690 B2 | 4/1994 |

* cited by examiner

*Primary Examiner* — Randy W Gibson
(74) *Attorney, Agent, or Firm* — Alleman Hall Creasman & Tuttle LLP

(57) ABSTRACT

When a combination calculator has selected both a first weighing hopper and a second weighing hopper corresponding to one feeding hopper, a controller drives a feeder so as to increase an amount of objects to be weighed that are held in the one feeding hopper, and then causes the one feeding hopper to discharge the objects to be weighed in both a first direction and a second direction concurrently to distribute the objects to be weighed to the first weighing hopper and the second weighing hopper that have been emptied.

6 Claims, 8 Drawing Sheets ical Field

COMBINATION WEIGHER HAVING CONTROLLED DISTRIBUTION BY BIDIRECTIONAL FEEDING HOPPERS

TECHNICAL FIELD

The present invention relates to a combination weigher that is provided with two weighing hoppers for one feeding hopper.

BACKGROUND ART

Conventionally, there is a known combination weigher configured to: perform combination calculation based on the weights of weighed objects that have been fed to a large number of weighing hoppers; select an optimal combination of weighing hoppers, in which the combination weight of the weighed objects is the closest value to a target combination weight; discharge the weighed objects only from the selected weighing hoppers; and collect the discharged weighed objects. In this manner, the weighed objects having a weight very close to the target combination weight can be obtained.

There is a type of combination weigher in which every two weighing hoppers form one group, and one feeding hopper (pool hopper) is provided above each group of weighing hoppers. For example, in the case of a combination weigher disclosed in Patent Literature 1, for each group of two weighing hoppers, it is prohibited to select the two weighing hoppers of the same group concurrently for forming an optimal combination. Therefore, objects to be weighed are fed from one feeding hopper to one of the two weighing hoppers selectively. Patent Literature 2 discloses another combination weigher in which, when both of two weighing hoppers forming one group are emptied concurrently, objects to be weighed are fed from a feeding hopper to the two weighing hoppers concurrently, such that substantially two halves of the objects to be weighed are fed to the two weighing hoppers, respectively.

CITATION LIST

Patent Literature

PTL 1: Japanese Examined Patent Application Publication No. H05-45889
PTL 2: Japanese Examined Patent Application Publication No. H06-25690

SUMMARY OF INVENTION

Technical Problem

However, in the configuration disclosed in Patent Literature 1, for each group of two weighing hoppers, it is prohibited when performing combination calculation to select the two weighing hoppers of the same group concurrently for forming an optimal combination. This causes reduction in the number of possible combinations that can be formed out of the total number of weighing hoppers, consequently causing reduction in quantitative precision.

In the configuration disclosed in Patent Literature 2, when both of the two weighing hoppers forming one group are emptied concurrently, objects to be weighed are fed from the feeding hopper to the two weighing hoppers, such that substantially two halves of the objects to be weighed are fed to the two weighing hoppers, respectively. That is, the weight of the objects to be weighed that are held by each of the two weighing hoppers is reduced by half. As a result, the number of weighing hoppers to combine to reach a target combination weight increases, which causes reduction in the number of possible combinations that can be formed. This consequently causes reduction in quantitative precision.

When both of the two weighing hoppers forming one group are emptied concurrently, it is conceivable to: feed the entire amount of objects to be weighed that are held in the feeding hopper from the feeding hopper to one of the two weighing hoppers; thereafter when the objects to be weighed are accumulated in the feeding hopper, feed the entire amount of the accumulated objects to be weighed from the feeding hopper to the other weighing hopper; and perform combination calculation after the objects to be weighed are thus fed to both of the two weighing hoppers. In this case, however, opening and closing operations of the gate of the feeding hopper are doubled. As a result, a stand-by time for the combination calculation increases, which causes reduction in the weighing speed.

In view of the above, an object of the present invention is to, in a combination weigher in which two weighing hoppers are provided for one feeding hopper, prevent the weighing speed and the quantitative precision from being reduced while allowing selecting the two weighing hoppers in the combination calculation.

Solution to Problem

A combination weigher according to one aspect of the present invention includes: a feeder; a plurality of feeding hoppers, each of which is configured to hold and discharge objects to be weighed that are conveyed from the feeder; a plurality of weighing hoppers, each of which is configured to hold the objects to be weighed that are discharged from one of the plurality of feeding hoppers, weigh the objects to determine a weight thereof, and discharge the weighed objects; a combination calculator configured to select a combination of weighing hoppers, from which to discharge the weighed objects, from among the plurality of weighing hoppers based on weights of the weighed objects, the weights being determined by the plurality of respective weighing hoppers, and a target combination weight; and a controller configured to control operations of the feeder, the feeding hoppers, and the weighing hoppers. Each of the plurality of feeding hoppers is configured to be able to discharge the objects to be weighed in either a first direction or a second direction selectively, and be able to discharge the objects to be weighed in both the first direction and the second direction concurrently. The plurality of weighing hoppers include: a first weighing hopper configured to hold the objects to be weighed that are discharged from one of the feeding hoppers in the first direction; and a second weighing hopper configured to hold the objects to be weighed that are discharged from the one feeding hopper in the second direction. When the combination calculator has selected both the first weighing hopper and the second weighing hopper corresponding to the one feeding hopper, the controller drives the feeder so as to increase an amount of the objects to be weighed that are held in the one feeding hopper, and then causes the one feeding hopper to discharge the objects to be weighed in both the first direction and the second direction concurrently to distribute the objects to be weighed to the first weighing hopper and the second weighing hopper that have been emptied.

According to the above configuration, when both the first weighing hopper and the second weighing hopper are selected by the combination calculation, the feeder is driven so as to increase the amount of objects to be weighed that are held in the feeding hopper. In this manner, the weight of the objects to be weighed that are fed from the feeding hopper to each of the first weighing hopper and the second weighing hopper after concurrent discharging from the first weighing hopper and the second weighing hopper is performed can be prevented from being reduced by half. As a result, reduction in the number of possible combinations of weighing hoppers is suppressed, and thereby reduction in quantitative precision can be suppressed. Further, in the combination calculation, it is not necessary to prohibit selecting both the first weighing hopper and the second weighing hopper concurrently for forming an optimal combination. Also for this reason, reduction in the number of possible combinations is suppressed, and thereby reduction in quantitative precision can be suppressed. In addition, when feeding the objects to be weighed to both the first weighing hopper and the second weighing hopper, the discharging operation of the feeding hopper needs to be performed only once. As a result, increase in a stand-by time for the combination calculation is suppressed, and thereby reduction in the weighing speed can be suppressed. Owing to these, the weighing speed and the quantitative precision can be prevented from being reduced while allowing selecting both the first weighing hopper and the second weighing hopper in the combination calculation.

The controller may drive the feeder for a predetermined time such that the objects to be weighed that have a target individual weight within a predetermined allowable weight range are fed to each feeding hopper, and then cause each feeding hopper to discharge the objects to be weighed in either the first direction or the second direction selectively. When the combination calculator has selected both the first weighing hopper and the second weighing hopper corresponding to the one feeding hopper, the controller may drive the feeder for the predetermined time, then additionally drive the feeder, and thereafter cause the one feeding hopper to discharge the objects to be weighed in both the first direction and the second direction.

According to the above configuration, when both the first weighing hopper and the second weighing hopper are selected by the combination calculation, the amount of objects to be weighed that are held in the feeding hopper can be readily increased.

The controller may drive the feeder at a predetermined amplitude such that the objects to be weighed that have a target individual weight within a predetermined allowable weight range are fed to each feeding hopper, and then cause each feeding hopper to discharge the objects to be weighed in either the first direction or the second direction selectively. When the combination calculator has selected both the first weighing hopper and the second weighing hopper corresponding to the one feeding hopper, the controller may drive the feeder at an amplitude greater than the predetermined amplitude, and then cause the one feeding hopper to discharge the objects to be weighed in both the first direction and the second direction.

According to the above configuration, when both the first weighing hopper and the second weighing hopper are selected by the combination calculation, the amount of objects to be weighed that are held in the feeding hopper can be increased promptly.

When the combination calculator has selected both the first weighing hopper and the second weighing hopper corresponding to the one feeding hopper, the controller may drive the feeder until the objects to be weighed are accumulated in the one feeding hopper so as to have such a weight that the objects to be weighed that have a weight within the allowable weight range are feedable to each of the first weighing hopper and the second weighing hopper.

According to the above configuration, reduction in the number of possible combinations after concurrent discharging from the first weighing hopper and the second weighing hopper is performed is prevented, and thereby reduction in quantitative precision can be prevented.

The controller may set a time from when the combination calculator has selected either the first weighing hopper or the second weighing hopper until when the one feeding hopper starts discharging the objects to be weighed to be equal to a time from when the combination calculator has selected both the first weighing hopper and the second weighing hopper until when the one feeding hopper starts discharging the objects to be weighed.

According to the above configuration, the weighing cycle of the combination weigher 1 can be kept constant in whichever of the following cases: a case where either the first weighing hopper or the second weighing hopper is selected by the combination calculation; and a case where both the first weighing hopper and the second weighing hopper are selected by the combination calculation.

Advantageous Effects of Invention

The present invention makes it possible to, in a combination weigher in which two weighing hoppers are provided for one feeding hopper, prevent the weighing speed and the quantitative precision from being reduced while allowing selecting the two weighing hoppers in the combination calculation.

DESCRIPTION OF EMBODIMENTS

Hereinafter, embodiments are described with reference to the drawings.

Figure 1:
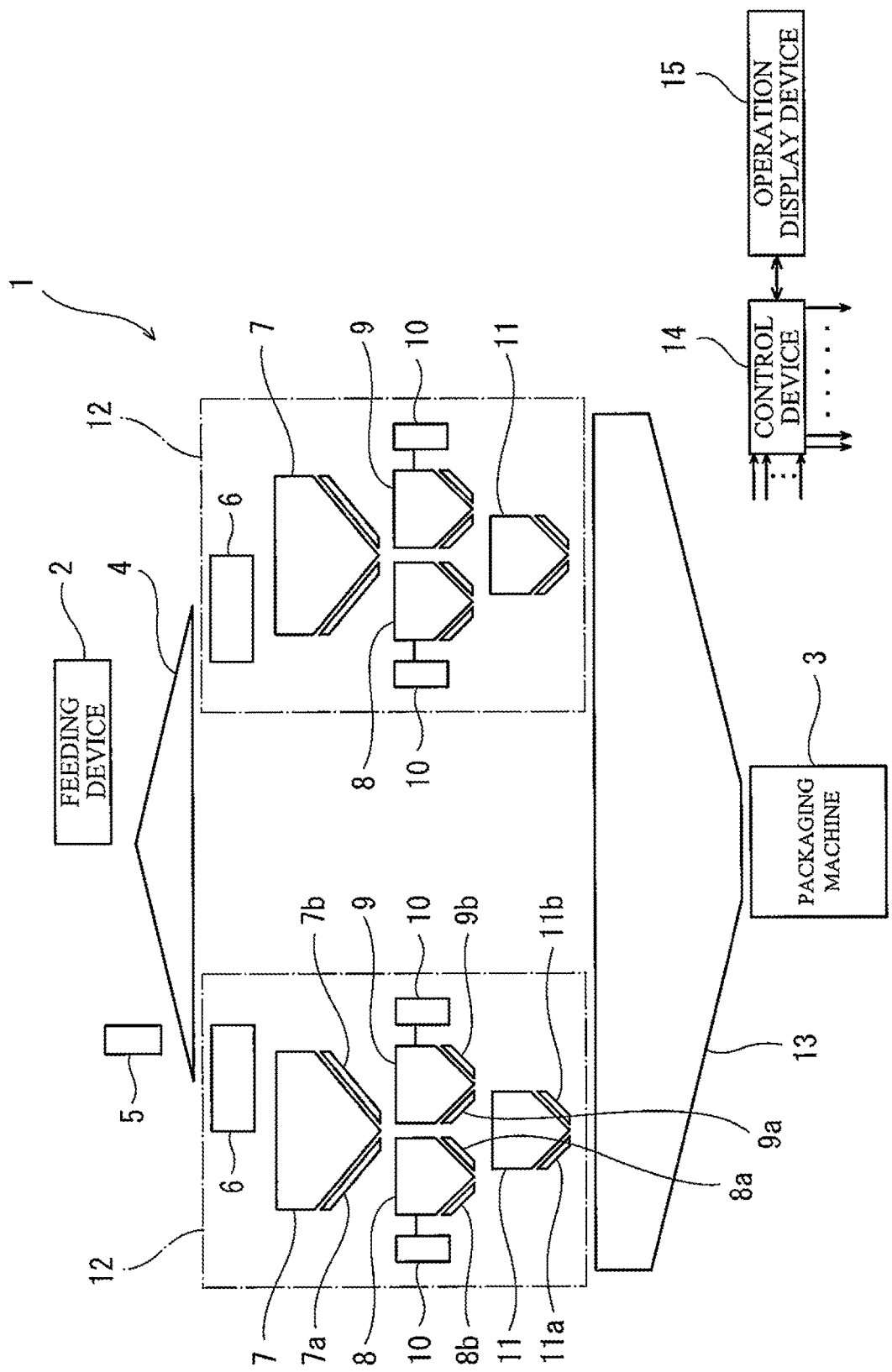
FIG. 1 is a schematic diagram of a combination weigher according to Embodiment 1.

FIG. 1 is a schematic diagram of a combination weigher 1 according to Embodiment 1. As shown in FIG. 1, a feeding device 2 for feeding objects to be weighed to the combination weigher 1 is provided preceding the combination weigher 1, and a packaging machine 3 for packaging the objects after the objects have been subjected to combination weighing is provided subsequent to the combination weigher 1. A dispersion feeder 4 having a conical shape and including a vibrator is provided at the center of the top part of the combination weigher 1. A sensor configured to detect the amount of objects to be weighed that are present on the dispersion feeder 4, for example, an ultrasonic level sensor 5, is provided above the dispersion feeder 4.

By utilizing vibration generated by the vibrator, the dispersion feeder 4 radially disperses the objects to be weighed that are fed from the feeding device 2. A plurality of linear feeders 6, each of which includes a vibrator, are radially arranged around the dispersion feeder 4. The linear feeders 6, by utilizing vibration, convey the objects to be weighed that are fed from the dispersion feeder 4, and feed out the objects to be weighed to feeding hoppers 7, which are provided at the object feed-out side of the linear feeders 6, respectively. Each of the feeding hoppers 7 holds the objects to be weighed that are fed from a corresponding one of the linear feeders 6, and discharges them downward.

A first weighing hopper 8 and a second weighing hopper 9 are provided below each of the feeding hoppers 7. That is, the two weighing hoppers 8 and 9 are provided corresponding to one feeding hopper 7. The capacity of the feeding hopper 7 is greater than the capacity of each of the first weighing hopper 8 and the second weighing hopper 9. As one example, in a direction in which the first weighing hopper 8 and the second weighing hopper 9 are arranged, the width of the feeding hopper 7 is greater than the width of each of the first weighing hopper 8 and the second weighing hopper 9.

Each of the first weighing hopper 8 and the second weighing hopper 9 is provided with a load cell as a weight sensor 10. The first weighing hopper 8 and the second weighing hopper 9 weigh the objects to be weighed that are held therein by means of the respective weight sensors 10. Each of the first weighing hopper 8 and the second weighing hopper 9 thus holds and weighs the objects to be weighed that are fed from the feeding hopper 7, and then discharges the weighed objects downward. One memory hopper 11 is provided below, and at a middle position between, the first weighing hopper 8 and the second weighing hopper 9. It should be noted that, alternatively, two memory hoppers 11 may be provided corresponding to the first weighing hopper 8 and the second weighing hopper 9, respectively.

The combination weigher 1 includes a plurality of weighing units 12, each of which is constituted by the linear feeder 6, the feeding hopper 7, the first weighing hopper 8, the second weighing hopper 9, the weight sensors 10, and the memory hopper 11. When seen in a top view, the plurality of weighing units 12 are arranged in a circular shape. A collecting chute 13 is provided below the first weighing hoppers 8, the second weighing hoppers 9, and the memory hoppers 11. The collecting chute 13 collects the weighed objects discharged from these hoppers, and discharges the collected objects from a bottom discharge port.

The feeding hopper 7 is provided with a gate 7a and a gate 7b. The gate 7a is a gate for discharging the objects to be weighed in a first direction toward the first weighing hopper 8. The gate 7b is a gate for discharging the objects to be weighed in a second direction toward the second weighing hopper 9. That is, by opening one of the gates 7a and 7b, the feeding hopper 7 can selectively discharge the objects to be weighed to either the first weighing hopper 8 or the second weighing hopper 9. On the other hand, by opening both the gates 7a and 7b, the feeding hopper 7 can concurrently discharge two halves of the objects to be weighed to both the first weighing hopper 8 and the second weighing hopper 9, respectively.

The first weighing hopper 8 is provided with a gate 8a and a gate 8b. The gate 8a is a gate for discharging the weighed objects to the memory hopper 11. The gate 8b is a gate for discharging the weighed objects to the collecting chute 13. The second weighing hopper 9 is also provided with a gate 9a and a gate 9b. The gate 9a is a gate for discharging the weighed objects to the memory hopper 11. The gate 9b is a gate for discharging the weighed objects to the collecting chute 13. If the memory hopper 11 is emptied when the weighed objects are held in the first weighing hopper 8 or the second weighing hopper 9, the gate 8a of the first weighing hopper 8 or the gate 9a of the second weighing hopper 9 is opened to feed the weighed objects to the memory hopper 11. The memory hopper 11 is provided with gates 11a and 11b for discharging the weighed objects to the collecting chute 13. The combination weigher 1 is provided with a control device 14 and an operation display device 15, which are described below.

Figure 2:
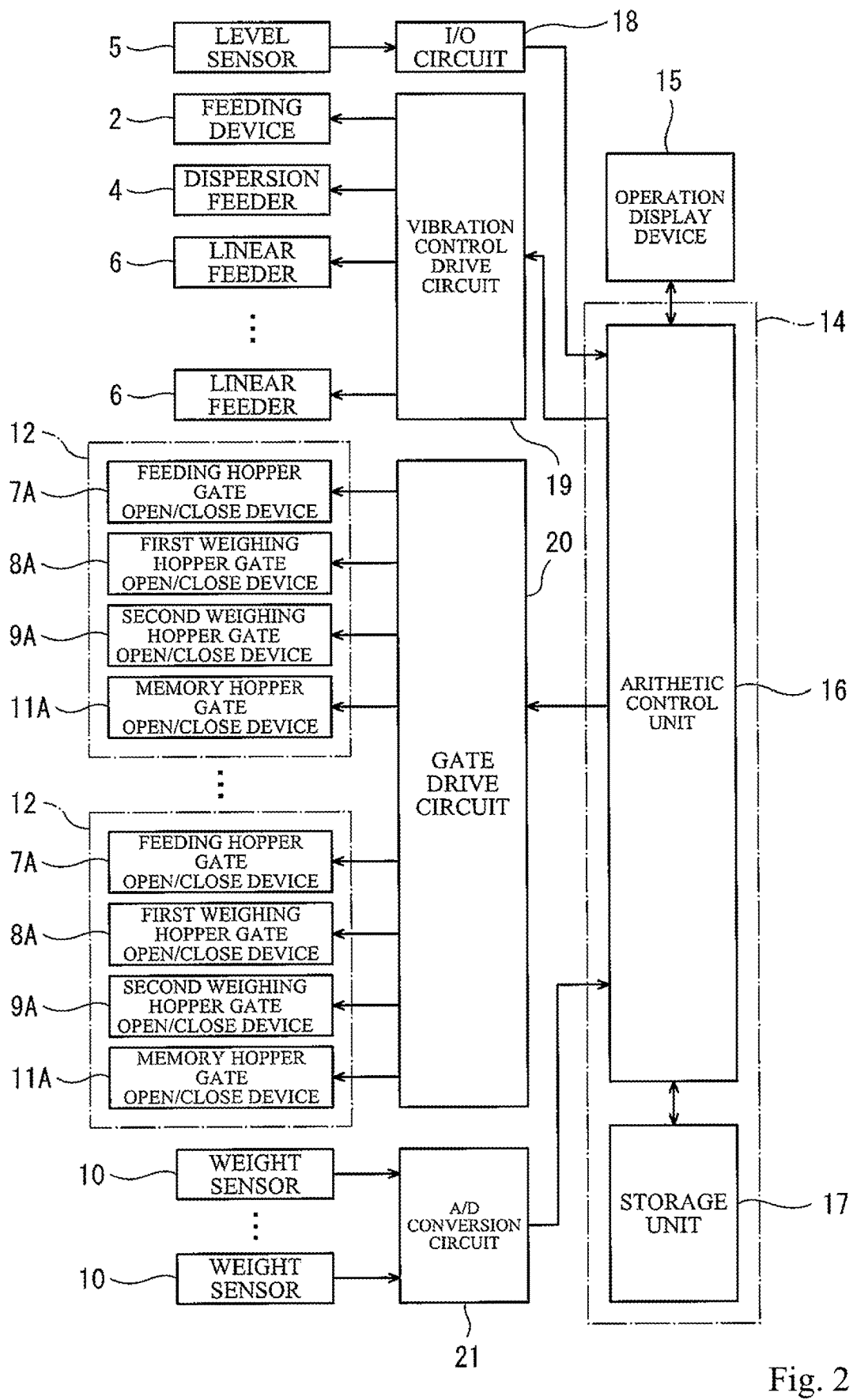
FIG. 2 is a block diagram of a control system of the combination weigher shown in FIG. 1.

FIG. 2 is a block diagram of a control system of the combination weigher 1 shown in FIG. 1. As shown in FIG. 2, the control device 14 includes: an arithmetic control unit 16 including, for example, a CPU; and a storage unit 17 including memories, such as a RAM and a ROM. The storage unit 17 stores therein, for example, a running program, running setting data containing a large number of running parameters, and weighing value data. The arithmetic control unit 16 executes the running program stored in the storage unit 17, thereby controlling the feeding device 2 and the combination weigher 1 and performing combination calculation. The arithmetic control unit 16 controls a vibrator of the feeding device 2 via a vibration control drive circuit 19 based on a signal that is inputted from the level sensor 5 via an I/O circuit 18, such that the objects to be weighed that are present on the dispersion feeder 4 are in a constant amount. The arithmetic control unit 16 also controls the operation of the vibrator of the dispersion feeder 4 and the operation of each of the vibrators of the linear feeders 6 via the vibration control drive circuit 19.

The arithmetic control unit 16 controls, via a gate drive circuit 20, operations of actuators (e.g., pulse motors) of open/close devices 7A, 8A, 9A, and 11A of the gates 7a and 7b, the gates 8a and 8b, the gates 9a and 9b, and the gates 11a and 11b of the feeding hoppers 7, the first weighing hoppers 8, the second weighing hoppers 9, and the memory hoppers 11. The arithmetic control unit 16 receives weighing values from the weight sensors 10 via an A/D conversion circuit 21. The arithmetic control unit 16 receives input signals from the operation display device 15, and outputs signals to the operation display device 15, such as data to be displayed thereon.

The arithmetic control unit 16 performs combination calculation by which to determine one combination of hoppers from among the weighing hoppers 8 and 9 and the memory hoppers 11 of the plurality of weighing units 12 based on the weights of the weighed objects, the weights being detected by the respective weight sensors 7, such that the sum of the weighing values of the weighed objects in the determined combination of hoppers is closest to a predetermined target combination weight. When the weighed objects are fed from the first weighing hopper 8 or the second weighing hopper 9 to the memory hopper 11, the arithmetic control unit 16 recognizes the weighing value of the fed objects, the weighing value being determined at the weighing hopper (8 or 9) that have fed the weighed objects, as a weighing value of the weighed objects held by the memory hopper 11.

The operation display device 15 has: input functions for, for example, operating the combination weigher 1 and setting the running parameters; and display functions for displaying, for example, the running status of the combination weigher 1. The operation display device 15 includes, for example, a touch screen display, and a user performs operations on the screen, such as starting and stopping the running of the combination weigher 1. Also, by switching the display screen of the operation display device 15, the user can perform, for example, the setting of the running parameters of the combination weigher 1. While the combination weigher 1 is running, the operation display device 15 displays, for example, the running status of the combination weigher 1, such as the running speed and combination calculation results.

Next, operations of the combination weigher 1 are described briefly. It should be noted that operations of the combination weigher 1 and the feeding device 2 are realized by the control performed by the control device 14.

As shown in FIGS. 1 and 2, first, objects to be weighed are conveyed by the feeding device 2 to a position above the combination weigher 1, and fed to the dispersion feeder 4. The objects to be weighed that have been fed to the dispersion feeder 4 are dispersed radially by the vibration of the dispersion feeder 4, and fed to each of the linear feeders 6. Then, the objects to be weighed are fed from the linear feeders 6 to the respective feeding hoppers 7, which are arranged in a circular shape. When the first weighing hopper 8 and/or the second weighing hopper 9 positioned below one feeding hopper 7 is/are empty, the objects to be weighed that are held by the feeding hopper 7 are fed to the empty weighing hopper(s) (i.e., the first weighing hopper 8 and/or the second weighing hopper 9). Here, by opening and closing one gate 7a of the feeding hopper 7, the objects to be weighed are fed to the first weighing hopper 8, and by opening and closing the other gate 7b of the feeding hopper 7, the objects to be weighed are fed to the second weighing hopper 9. Also, when the memory hopper 11 positioned below the first weighing hopper 8 and the second weighing hopper 9 is empty, by opening and closing the gate 8a or the gate 9a at the memory hopper 11 side of the first weighing hopper 8 or the second weighing hopper 9, the weighed objects are fed to the memory hopper 11.

The arithmetic control unit 16 performs the aforementioned combination calculation to determine a combination of hoppers, from which the weighed objects are to be discharged. The weighed objects are discharged to the collecting chute 13 from the hoppers selected for the combination. At the time, by opening and closing the gates 11a and 11b of the memory hoper 11, the weighed objects are discharged from the memory hopper 11, and by opening and closing the gates 8b and 9b at the collecting chute 13 side of the weighing hoppers 8 and 9, the weighed objects are discharged from the weighing hoppers 8 and 9. The weighed objects slide on the collecting chute 13 downward, and are discharged from the discharge port of the collecting chute 13 to the packaging machine 3. For example, the packaging machine 3, while producing bags, fills the bags with the weighed objects discharged from the collecting chute 13 for packaging.

Figure 3:
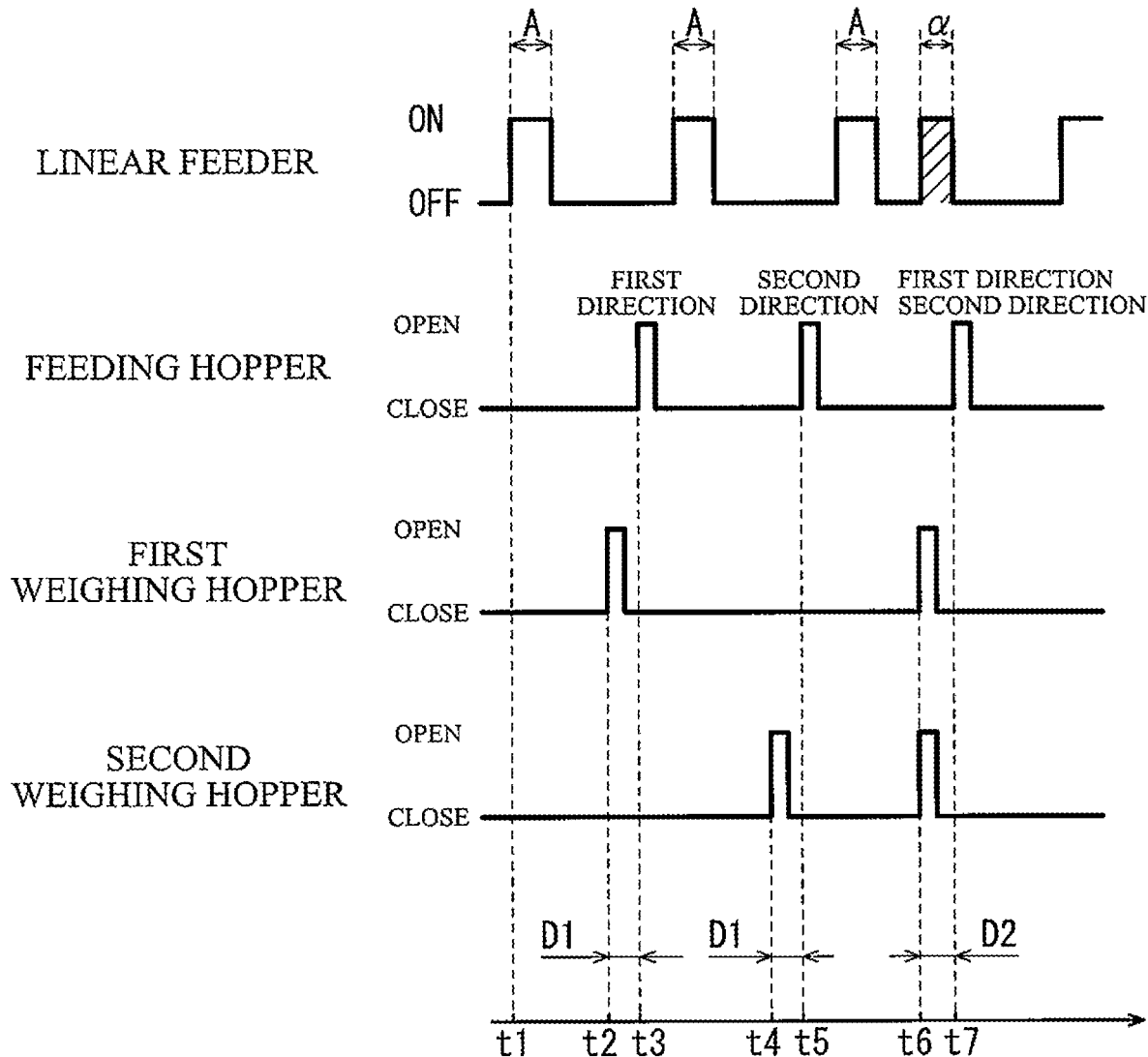
FIG. 3 is a control timing chart of the combination weigher shown in FIG. 1.

Next, operations of the combination weigher 1 are described in detail. FIG. 3 is a control timing chart of the combination weigher 1 shown in FIG. 1. As shown in FIG. 3, as a result of the linear feeder 6 being driven for a predetermined time A (t1), objects to be weighed that have a target individual weight within a predetermined allowable weight range are fed to the feeding hopper 7. For example, if the first weighing hopper 8 is selected for an optimal combination by the combination calculation, the first weighing hopper 8 discharges the weighed objects (t2: selective discharging). The feeding hopper 7 feeds the emptied first weighing hopper 8 with the objects to be weighed that have the aforementioned target individual weight (t3). Similarly, if the second weighing hopper 9 is selected for an optimal combination by the combination calculation, the second weighing hopper 9 discharges the weighed objects (t4: selective discharging), and then the feeding hopper 7 discharges the objects to be weighed to the emptied second weighing hopper 9 (t5).

If both the first weighing hopper 8 and the second weighing hopper 9 are selected for an optimal combination by the combination calculation, each of the first weighing hopper 8 and the second weighing hopper 9 discharges the weighed objects (t6: concurrent discharging), and the linear feeder 6 is driven so as to increase the amount of objects to be weighed that are held in the feeding hopper 7. Specifically, if concurrent discharging from the first weighing hopper 8 and the second weighing hopper 9 is selected by the combination calculation, the drive time of the linear feeder 6 is extended by a predetermined additional time α as compared to a case where selective discharging from the first weighing hopper 8 or the second weighing hopper 9 is selected by the combination calculation.

In the present embodiment, the additional time α is a period of time during which the objects to be weighed are accumulated in the feeding hopper 7 so as to have such a weight that, when the accumulated objects to be weighed are discharged from the feeding hopper 7 to the first weighing hopper 8 and the second weighing hopper 9 bi-directionally and concurrently, the objects to be weighed that have a weight within the allowable weight range are feedable to each of the first weighing hopper 8 and the second weighing hopper 9. The additional time α may be, for example, a value within the range of 80 to 110% of the predetermined time A. More preferably, the additional time α may be a value within the range of 90 to 105% of the predetermined time A. However, the additional time α may also be a value within the range of 20 to 80% of the predetermined time A.

The amplitude of the linear feeder 6 during the additional time α may be the same as the amplitude of the linear feeder 6 during the predetermined time A, and the additional time α may be equal to the predetermined time A. However, if the amplitude of the linear feeder 6 during the additional time α is greater than the amplitude of the linear feeder 6 during the predetermined time A, the additional time α can be favorably reduced while sufficiently increasing the amount of objects to be weighed that are held in the feeding hopper 7. When both the first weighing hopper 8 and the second weighing hopper 9 are selected by the combination calculation, the driving of the linear feeder 6 for the additional time α may be started before the concurrent discharging from the first weighing hopper 8 and the second weighing hopper 9 is completed (i.e., before the gates of these hoppers are closed). In this manner, the weighing cycle can be shortened favorably.

In FIG. 3, at a point when the concurrent discharging from the first weighing hopper 8 and the second weighing hopper 9 is selected by the combination calculation, the driving of the linear feeder 6 (for the predetermined time A) has already been ended. For this reason, the linear feeder 6 is newly started to drive the linear feeder 6 for the additional time α. However, if the driving of the linear feeder 6 (for the predetermined time A) has not yet been ended at the point when the concurrent discharging is selected, the operation of driving the linear feeder 6 may be continuously extended by the additional time α. Then, when the additional time α has elapsed, the objects to be weighed are distributed from the feeding hopper 7 to both the emptied first weighing hopper 8 and the emptied second weighing hopper 9 concurrently (t7).

In the weighing cycle, the drive time and amplitude of the linear feeder 6 and the discharge timing of the feeding hopper 7 are adjusted, such that the discharge timing in a case where the objects to be weighed are discharged from the feeding hopper 7 to both the first weighing hopper 8 and the second weighing hopper 9 concurrently is the same as the discharge timing in a case where the objects to be weighed are discharged from the feeding hopper 7 to either the first weighing hopper 8 or the second weighing hopper 9 selectively. Specifically, a time D1 from when selective discharging from the first weighing hopper 8 or the second weighing hopper 9 is selected by the combination calculation until when the feeding hopper 7 starts discharging the objects to be weighed is equal to a time D2 from when concurrent discharging from the first weighing hopper 8 and the second weighing hopper 9 is selected by the combination calculation until when the feeding hopper 7 starts discharging the objects to be weighed. A conceivable way of equalizing the time D1 and the time D2 to each other is, for example, increasing the amplitude of the linear feeder 6 during the additional time α, or causing the feeding hopper 7 to start the discharging after a certain period of time has elapsed since the selective discharging from the first weighing hopper 8 or the second weighing hopper 9 is completed. It should be noted that the time D2 may be longer than the time D1.

Figure 4A:
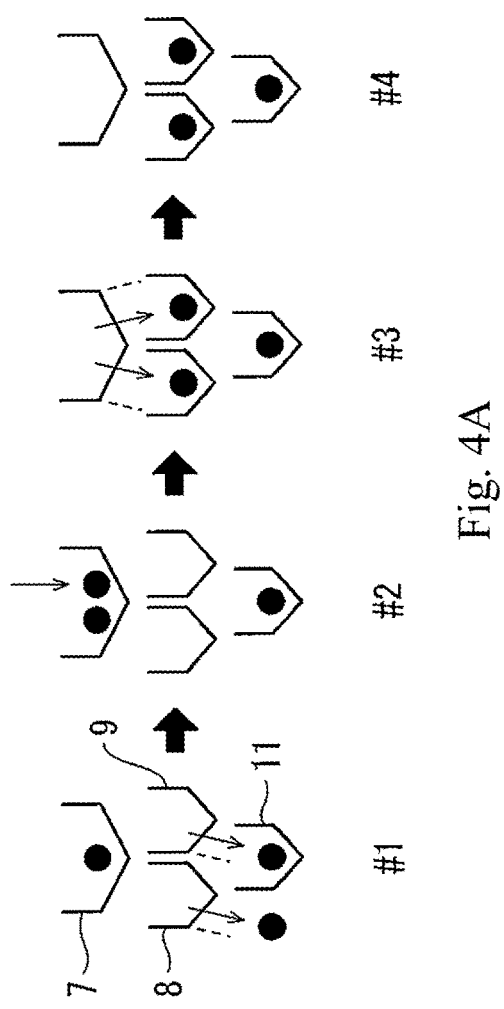
FIG. 4A is a schematic diagram illustrating operation steps of the combination weigher shown in FIG. 1.
Figure 4B:
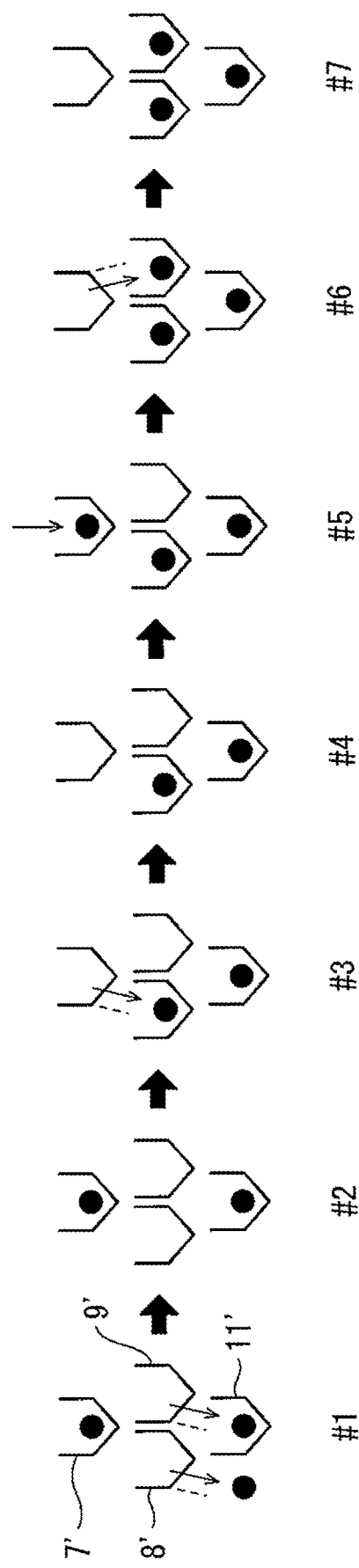
FIG. 4B is a schematic diagram illustrating operation steps of a combination weigher of a comparative example.

FIG. 4A is a schematic diagram illustrating operation steps of the combination weigher 1 shown in FIG. 1, and FIG. 4B is a schematic diagram illustrating operation steps of a combination weigher of a comparative example. As shown in FIG. 4A, in the combination weigher 1 of the present embodiment, as previously described, when concurrent discharging from the first weighing hopper 8 and the second weighing hopper 9 occurs (#1), the following operation steps are performed: objects to be weighed are added to the feeding hopper 7 from the linear feeder 6 (#2); the objects to be weighed are discharged from the feeding hopper 7 to both the first weighing hopper 8 and the second weighing hopper 9 concurrently (#3); and the gate of the feeding hopper 7 is closed (#4).

On the other hand, as shown in FIG. 4B, in the combination weigher of the comparative example, when concurrent discharging from a first weighing hopper 8' and a second weighing hopper 9' occurs (#1), the following operation steps are performed: the gates of the first weighing hopper 8' and the second weighing hopper 9' are closed (#2); the gate of a feeding hopper 7' is opened to discharge objects to be weighed to the first weighing hopper 8' (#3); after the discharging, the gate of the feeding hopper 7' is closed (#4); the feeding hopper 7' is replenished with objects to be weighed that are fed from the linear feeder (#5); the objects to be weighed are discharged from the feeding hopper 7' to the second weighing hopper 9' (#6); and the gate of the feeding hopper 7 is closed (#7).

It is clear from the comparison between FIG. 4A and FIG. 4B that, in the case of the combination weigher 1 of the present embodiment, the number of times of opening and closing the gate of the feeding hopper 7 is less than in the case of the combination weigher of the comparative example, and also, increasing the amount of objects to be weighed that are held in the feeding hopper 7 can be started without waiting for closing of the gates of the first weighing hopper 8 and the second weighing hopper 9. As a result, a time from when the concurrent discharging from the first weighing hopper 8 and the second weighing hopper 9 occurs until when the feeding of the objects to be weighed to both the first weighing hopper 8 and the second weighing hopper 9 is completed is shortened.

According to the above-described configuration, when both the first weighing hopper 8 and the second weighing hopper 9 are selected by the combination calculation, the linear feeder 6 is driven so as to increase the amount of objects to be weighed that are held in the feeding hopper 7. In this manner, the weight of the objects to be weighed that are fed from the feeding hopper 7 to each of the first weighing hopper 8 and the second weighing hopper 9 after the concurrent discharging from the first weighing hopper 8 and the second weighing hopper 9 is performed can be prevented from being reduced by half. As a result, reduction in the number of possible combinations of weighing hoppers is suppressed, and thereby reduction in quantitative precision can be suppressed. To be more specific, the linear feeder 6 is driven until the objects to be weighed are accumulated in the feeding hopper 7 so as to have such a weight that the objects to be weighed that have a weight within the allowable weight range are feedable to each of the first weighing hopper 8 and the second weighing hopper 9. As a result, reduction in the number of possible combinations after the concurrent discharging from the first weighing hopper 8 and the second weighing hopper 9 is performed is prevented, and thereby reduction in quantitative precision can be suppressed.

Further, in the combination calculation, it is not necessary to prohibit selecting both the first weighing hopper 8 and the second weighing hopper 9 concurrently for forming an optimal combination. Also for this reason, reduction in the number of possible combinations is suppressed, and thereby reduction in quantitative precision can be suppressed. In addition, when feeding the objects to be weighed to both the first weighing hopper 8 and the second weighing hopper 9, the discharging operation of the feeding hopper 7 needs to be performed only once. As a result, increase in a stand-by time for the combination calculation is suppressed, and thereby reduction in the weighing speed can be suppressed.

Still further, when both the first weighing hopper 8 and the second weighing hopper 9 are selected by the combination calculation, the linear feeder 6 is additionally driven after the linear feeder 6 is driven for the predetermined time A. This makes it possible to readily increase the amount of objects to be weighed that are held in the feeding hopper 7. Still further, when both the first weighing hopper 8 and the second weighing hopper 9 are selected by the combination calculation, the amount of objects to be weighed that are held in the feeding hopper 7 can be increased promptly by increasing the amplitude of the linear feeder 6. Still further, by equalizing the time D1 and the time D2 to each other, the weighing cycle of the combination weigher 1 can be kept constant. It should be noted that, if the time D2 is set to be longer than the time D1, then in a case where the objects to be weighed are discharged from the feeding hopper 7 to either the first weighing hopper 8 or the second weighing hopper 9 selectively, the discharge timing can be made as early as possible, while in a case where the objects to be weighed are discharged from the feeding hopper 7 to both the first weighing hopper 8 and the second weighing hopper 9, the amount of objects to be weighed that are held in the feeding hopper 7 can be suitably increased.

Embodiment 2

Figure 5:
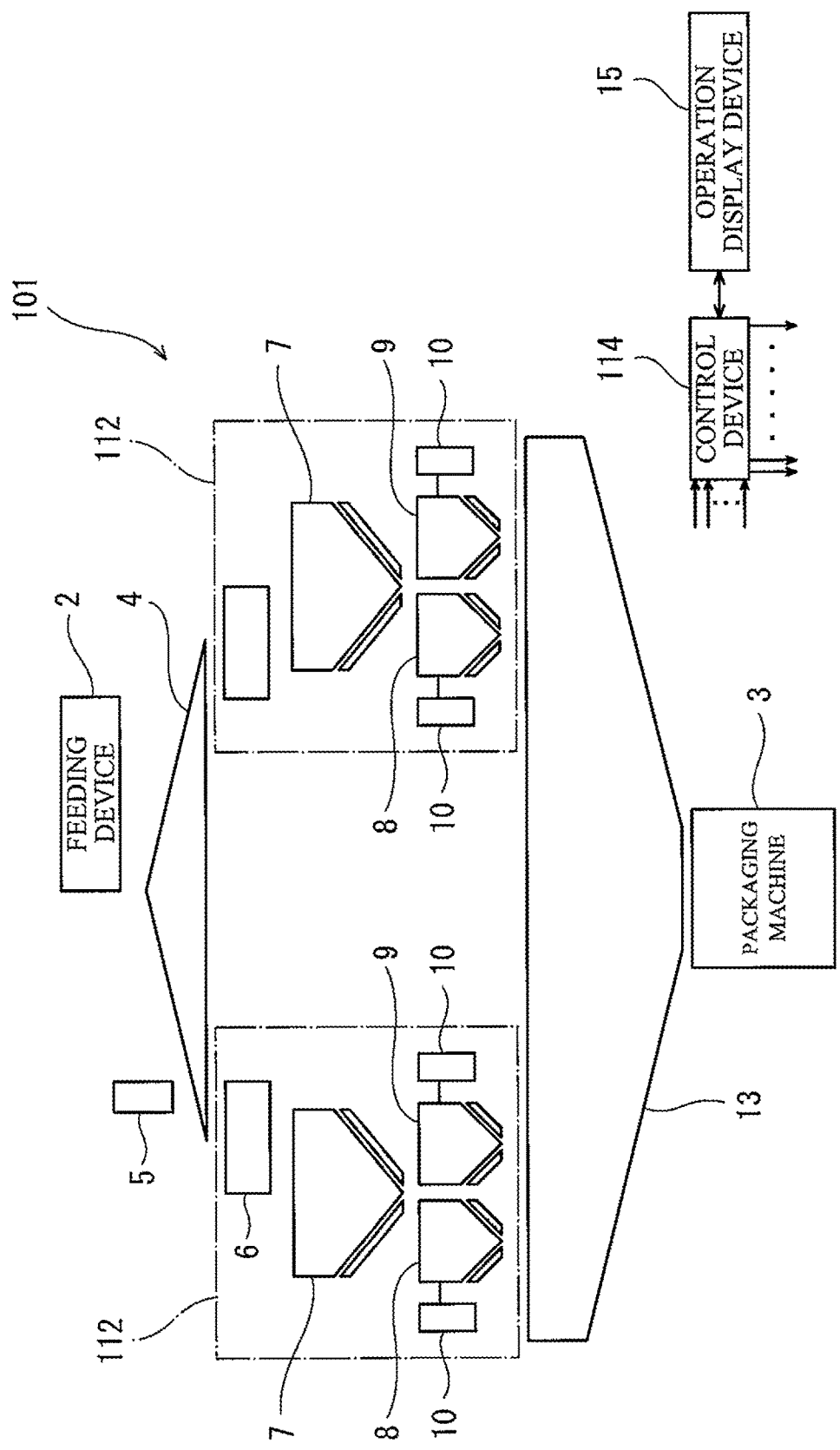
FIG. 5 is a schematic diagram of a combination weigher according to Embodiment 2.

FIG. 5 is a schematic diagram of a combination weigher 101 according to Embodiment 2. It should be noted that, in the present embodiment, the same components as those described in Embodiment 1 are denoted by the same reference signs as those used in Embodiment 1, and the description of such components is omitted. As shown in FIG. 5, Embodiment 2 is different from Embodiment 1 in that the combination weigher 101 of Embodiment 2 does not include the memory hopper. Specifically, a weighing unit 112 of the combination weigher 101 is constituted by the linear feeder 6, the feeding hopper 7, the first weighing hopper 8, the second weighing hopper 9, and the weight sensors 10. Operations of the combination weigher 101 and the feeding device 2 are realized by control performed by a control device 114.

Figure 6:
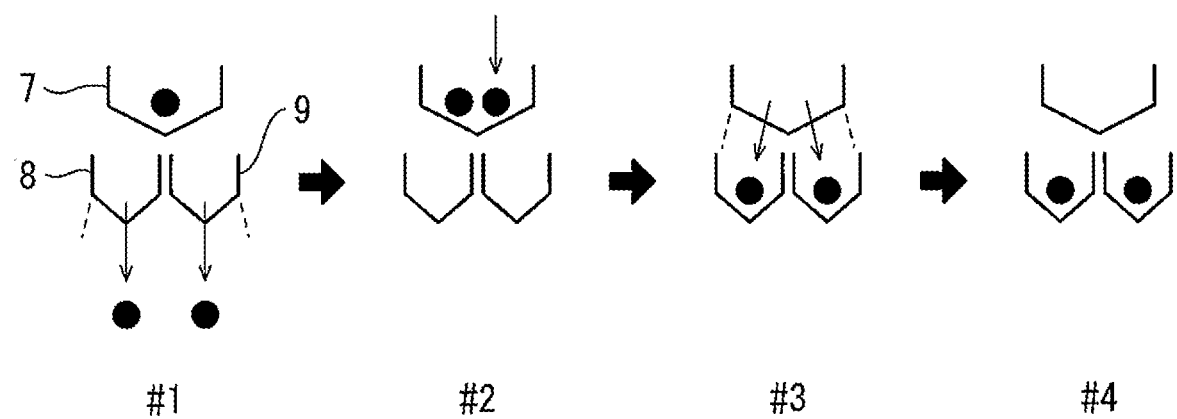
FIG. 6 is a schematic diagram illustrating operation steps of the combination weigher shown in FIG. 5.

FIG. 6 is a schematic diagram illustrating operation steps of the combination weigher 101 shown in FIG. 5. As shown in FIG. 6, similar to Embodiment 1, in the combination weigher 101, when weighed objects are discharged to the collecting chute from the first weighing hopper 8 and the second weighing hopper 9 concurrently (#1), the following operation steps are performed: the feeding hopper 7 is replenished with objects to be weighed that are fed from the linear feeder 6 (#2); the objects to be weighed are discharged from the feeding hopper 7 to both the first weighing hopper 8 and the second weighing hopper 9 concurrently (#3); and the gate of the feeding hopper 7 is closed (#4). Since the other configurational features are the same as those described above in Embodiment 1, the detailed description thereof is omitted.

Embodiment 3

Figure 7:
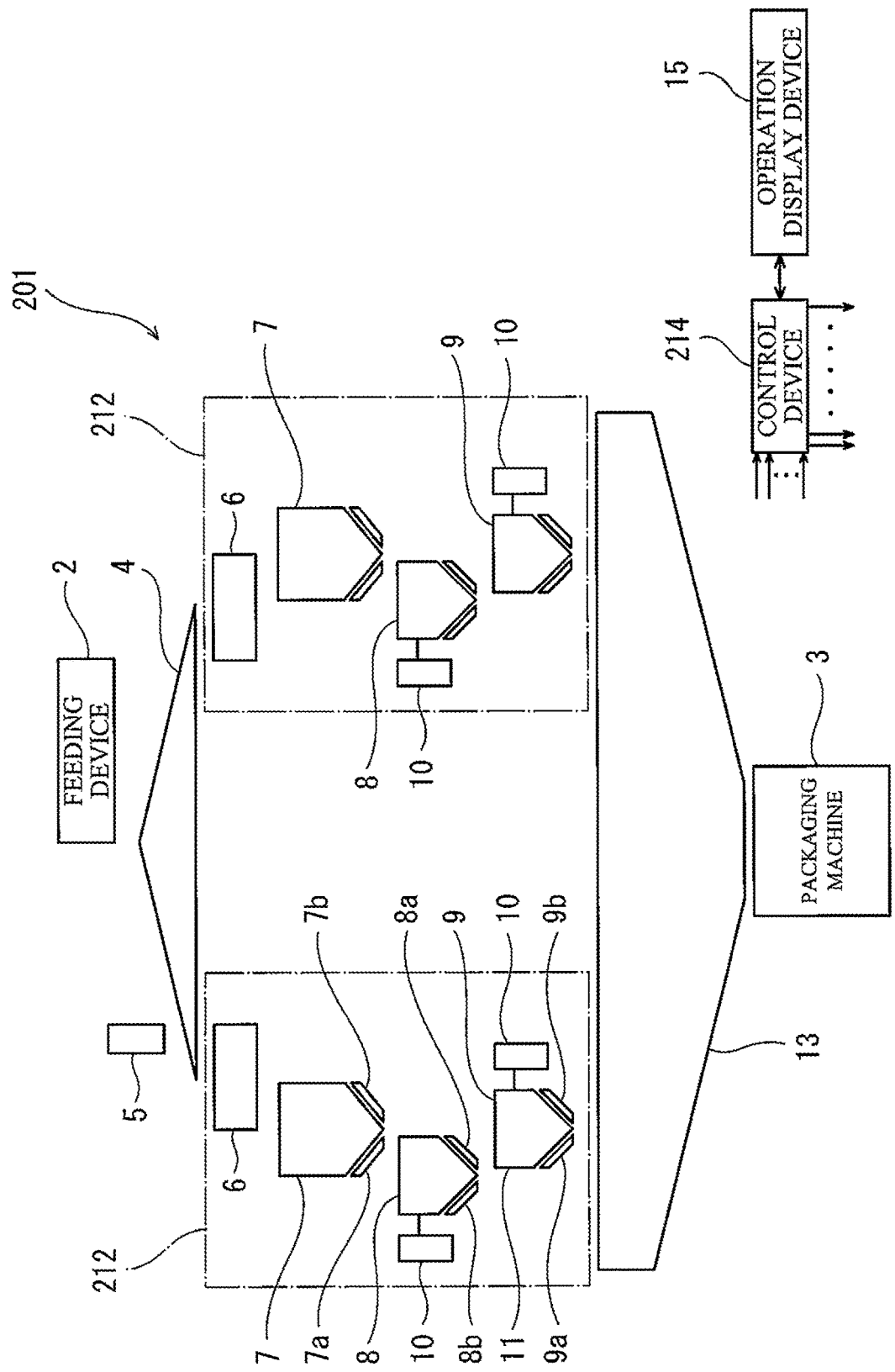
FIG. 7 is a schematic diagram of a combination weigher according to Embodiment 3.

FIG. 7 is a schematic diagram of a combination weigher 201 according to Embodiment 3. It should be noted that, in the present embodiment, the same components as those described in Embodiment 1 are denoted by the same reference signs as those used in Embodiment 1, and the description such components is omitted. As shown in FIG. 7, in the combination weigher 201 of Embodiment 3, a weighing unit 212 is constituted by the linear feeder 6, the feeding hopper 7, the first weighing hopper 8, the second weighing hopper 9, and the weight sensors 10. The second weighing hopper 9 is positioned lower than the first weighing hopper 8. That is, objects to be weighed can be fed to the second weighing hopper 9 from the feeding hopper 7, and also, objects to be weighed can be fed to the second weighing hopper 9 from the first weighing hopper 8. Operations of the combination weigher 201 and the feeding device 2 are realized by control performed by a control device 214.

Figure 8:
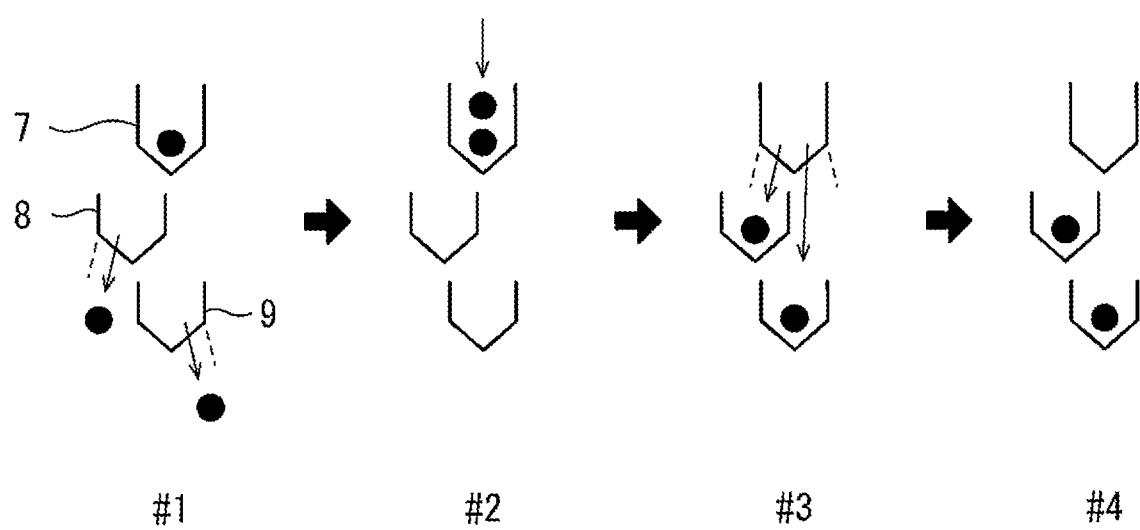
FIG. 8 is a schematic diagram illustrating operation steps of the combination weigher shown in FIG. 7.

FIG. 8 is a schematic diagram illustrating operation steps of the combination weigher 201 shown in FIG. 7. As shown in FIG. 8, similar to Embodiment 1, in the combination weigher 201, when weighed objects are discharged to the collecting chute from the first weighing hopper 8 and the second weighing hopper 9 concurrently (#1), the following operation steps are performed: the feeding hopper 7 is replenished with objects to be weighed that are fed from the linear feeder 6 (#2); the objects to be weighed are discharged from the feeding hopper 7 to both the first weighing hopper 8 and the second weighing hopper 9 concurrently (#3); and the gate of the feeding hopper 7 is closed (#4). Since the other configurational features are the same as those described above in Embodiment 1, the detailed description thereof is omitted.

REFERENCE CHARACTERS LIST 1, 101, 201 combination weigher
6 linear feeder
7 feeding hopper
8 first weighing hopper
9 second weighing hopper
10 weight sensor
12, 112, 212 weighing unit
13 collecting chute
14 control device (controller, combination calculator)

The invention claimed is:

1. A combination weigher comprising:
a feeder;
a plurality of feeding hoppers, each of which is configured to hold and discharge objects to be weighed that are conveyed from the feeder;
a plurality of weighing hoppers, each of which is configured to hold the objects to be weighed that are discharged from one of the plurality of feeding hoppers, weigh the objects to determine a weight thereof, and discharge the weighed objects;
a combination calculator configured to select a combination of weighing hoppers, from which to discharge the weighed objects, from among the plurality of weighing hoppers based on weights of the weighed objects, the weights being determined by the plurality of respective weighing hoppers, and a target combination weight; and
a controller configured to control operations of the feeder, the feeding hoppers, and the weighing hoppers, wherein
each of the plurality of feeding hoppers is configured to be able to discharge the objects to be weighed in either a first direction or a second direction selectively, and be able to discharge the objects to be weighed in both the first direction and the second direction concurrently,
the plurality of weighing hoppers include:
a first weighing hopper configured to hold the objects to be weighed that are discharged from one of the feeding hoppers in the first direction; and
a second weighing hopper configured to hold the objects to be weighed that are discharged from the one feeding hopper in the second direction, and
when the combination calculator has selected both the first weighing hopper and the second weighing hopper corresponding to the one feeding hopper, the controller drives the feeder so as to increase an amount of the objects to be weighed that are held in the one feeding hopper, and then causes the one feeding hopper to discharge the objects to be weighed in both the first direction and the second direction concurrently to distribute the objects to be weighed to the first weighing hopper and the second weighing hopper that have been emptied.

2. The combination weigher according to claim 1, wherein
the controller drives the feeder for a predetermined time such that the objects to be weighed that have a target individual weight within a predetermined allowable weight range are fed to each feeding hopper, and then causes each feeding hopper to discharge the objects to be weighed in either the first direction or the second direction selectively, and when the combination calculator has selected both the first weighing hopper and the second weighing hopper corresponding to the one feeding hopper, the controller drives the feeder for the predetermined time, then additionally drives the feeder, and thereafter causes the one feeding hopper to discharge the objects to be weighed in both the first direction and the second direction.

3. The combination weigher according to claim 1, wherein the controller drives the feeder at a predetermined amplitude such that the objects to be weighed that have a target individual weight within a predetermined allowable weight range are fed to each feeding hopper, and then causes each feeding hopper to discharge the objects to be weighed in either the first direction or the second direction selectively, and when the combination calculator has selected both the first weighing hopper and the second weighing hopper corresponding to the one feeding hopper, the controller drives the feeder at an amplitude greater than the predetermined amplitude, and then causes the one feeding hopper to discharge the objects to be weighed in both the first direction and the second direction.

4. The combination weigher according to claim 1, wherein when the combination calculator has selected both the first weighing hopper and the second weighing hopper corresponding to the one feeding hopper, the controller drives the feeder until the objects to be weighed are accumulated in the one feeding hopper so as to have such a weight that the objects to be weighed that have a weight within a predetermined allowable weight range are feedable to each of the first weighing hopper and the second weighing hopper.

5. The combination weigher according to claim 1, wherein the controller sets a time from when the combination calculator has selected either the first weighing hopper or the second weighing hopper until when the one feeding hopper starts discharging the objects to be weighed to be equal to a time from when the combination calculator has selected both the first weighing hopper and the second weighing hopper until when the one feeding hopper starts discharging the objects to be weighed.

6. A combination weigher comprising:

a feeder;

a plurality of feeding hoppers, each of which is configured to hold and discharge objects to be weighed that are conveyed from the feeder;

a plurality of weighing hoppers, each of which is configured to hold the objects to be weighed that are discharged from one of the plurality of feeding hoppers, weigh the objects to determine a weight thereof, and discharge the weighed objects;

a combination calculator configured to select a combination of weighing hoppers, from which to discharge the weighed objects, from among the plurality of weighing hoppers based on weights of the weighed objects, the weights being determined by the plurality of respective weighing hoppers, and a target combination weight; and a controller configured to control operations of the feeder, the feeding hoppers, and the weighing hoppers, wherein each of the plurality of feeding hoppers is configured to be able to discharge the objects to be weighed in either a first direction or a second direction selectively, and be able to discharge the objects to be weighed in both the first direction and the second direction concurrently, the plurality of weighing hoppers include:
a first weighing hopper configured to hold the objects to be weighed that are discharged from one of the feeding hoppers in the first direction; and
a second weighing hopper configured to hold the objects to be weighed that are discharged from the one feeding hopper in the second direction, when the combination calculator has selected both the first weighing hopper and the second weighing hopper corresponding to the one feeding hopper, the controller drives the feeder so as to increase an amount of the objects to be weighed that are held in the one feeding hopper, and then causes the one feeding hopper to discharge the objects to be weighed in both the first direction and the second direction concurrently to distribute the objects to be weighed to the first weighing hopper and the second weighing hopper that have been emptied, the controller drives the feeder for a predetermined time such that the objects to be weighed that have a target individual weight within a predetermined allowable weight range are fed to each feeding hopper, and then causes each feeding hopper to discharge the objects to be weighed in either the first direction or the second direction selectively, when the combination calculator has selected both the first weighing hopper and the second weighing hopper corresponding to the one feeding hopper, the controller drives the feeder for the predetermined time, then additionally drives the feeder, and thereafter causes the one feeding hopper to discharge the objects to be weighed in both the first direction and the second direction, and when the combination calculator has selected both the first weighing hopper and the second weighing hopper corresponding to the one feeding hopper, the controller drives the feeder until the objects to be weighed are accumulated in the one feeding hopper so as to have such a weight that the objects to be weighed that have a weight within a predetermined allowable weight range are feedable to each of the first weighing hopper and the second weighing hopper.

* * * * *